United States Patent [19]

Bose et al.

[11] 3,723,669

[45] Mar. 27, 1973

[54] HAND HELD MAGNETIC READER

[75] Inventors: Norman J. Bose, North Hollywood; Alexander S. Brown, Covina, both of Calif.

[73] Assignee: The Singer Company

[22] Filed: Dec. 16, 1971

[21] Appl. No.: 208,812

[52] U.S. Cl.......................179/100.2 C, 340/174.1 F

[51] Int. Cl...........................................G11b 5/22

[58] Field of Search..........340/174.1 F; 179/100.2 C; 346/74 MC; 235/61.11 D

[56] References Cited

UNITED STATES PATENTS

| | | | |
|---|---|---|---|
| 2,548,011 | 4/1951 | Frost | 179/100.2 HT |
| 3,416,241 | 12/1968 | Weitzner | 179/100.2 HT |

*Primary Examiner*—Vincent P. Canney
*Attorney*—Linval B. Castle

[57] ABSTRACT

A compact magnetic tape reader for binary coded magnetic tapes or merchandise labels. The reader includes an electrostatically and magnetically shielded transducer wound with a symmetrical center tapped coils coupled directly to an integrated circuit buffer amplifier having a low impedance output for reducing the transmission of noise through the cable that couples the reader to the circuitry in stationary computing equipment.

5 Claims, 5 Drawing Figures

PATENTED MAR 27 1973

3,723,669

HAND HELD MAGNETIC READER

The development of the large centralized digital computing system with numerous input-output terminals positioned at desired locations has led to widespread use of the digital computer for commercial applications. The vast computer memory capacities may be used to store and retrieve data relating to hotel or airline reservations, consumer credit ratings, stock exchange transactions, or the like. Another very important application is in the field of retail merchandising in which the computer not only maintains a continuous inventory of merchandise by model number, vendor, cost, and selling price, but also is coupled to terminal equipment which includes a reader for sensing various price and stock number data contained on labels attached to each item of the merchandise.

The reading devices that provide an input signal to the computing equipment may take a form of punched card readers or printed character recognition devices but are most conveniently in the form of magnetic transducers which may be "wiped" across the surface of a binary coded magnetic label to generate the necessary electrical input signals.

It is apparent that extremely high accuracy and reliability are essential for any computer input terminal. This is particularly difficult to achieve with a hand held magnetic transducer, not only because of the likelihood of signal error caused by induced noise but also because of the irregularities and inconsistencies of the human operator.

Briefly described, my invention is for a hand held magnetic reader particularly adaptable for use in reading binary coded tapes or merchandise labels. The reader is miniaturized to fit between the fingers of an operator and features a miniature transducer core made of printed or stamped laminates that are assembled and wound with a balanced center tapped winding; the core is then potted in a chrome plated mu metal capsule to provide electrostatic and magnetic shielding from induced noise and stray fields. The encapsulated core is then contoured and hard chrome plated at its working end to increase wear resistance and operating life, and the capsule is then mounted in a miniaturized housing adapted to fit between the fingers of the operator. The housing is provided with a "sight" which aids the operator in maintaining the transducer in near vertical alignment during its operation. The mounted core is coupled directly to a buffer amplifier in the housing. The amplifier not only provides signal amplification and noise rejection, but also may be used to provide a desired low impedance output to provide maximum signal transmission with minimum error to the circuits in the stationary unit to which the reader is connected.

In the drawings which illustrates a preferred embodiment of my invention:

DETAILED DESCRIPTION

Figure 1:
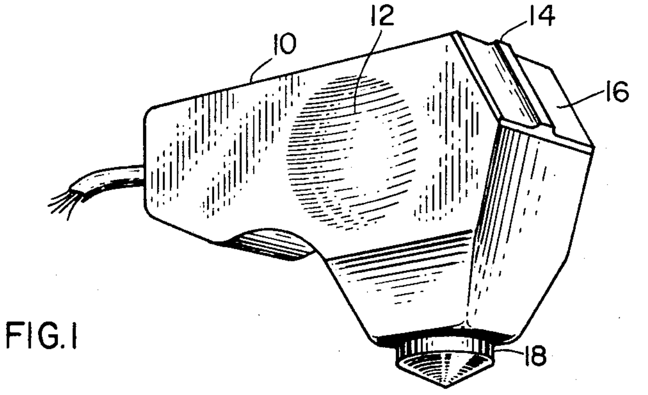
FIG. 1 is a perspective view illustrating the hand held magnetic reader.

FIG. 1 is an illustration of the preferred embodiment of my hand held magnetic reader. The housing 10 of the reader is preferably cast of a durable plastic such as polystyrene and is sufficiently small to fit between the fingers of the operator's hand. Convenient dimensions for the housing 10 are: total overall length of approximately 1¾ inches, total height of 1¼ inches, and maximum thickness of five eights inches. The exterior sidewalls of housing 10 are provided at convenient locations with finger indentations 12 that are approximately an inch in diameter and one sixteenth inch deep. An important feature of housing 10 is the sighting ridge 14 which extends approximately one sixteenth inch out from the housing surface 16 that is positioned at the forward end of housing 10 and which is slanted approximately 30° from the vertical. Sighting ridge 14 is thus generally along the line of sight of the operator as he looks down towards a magnetically coded tape or label and enables the operator to easily maintain the magnetic reader in a vertical position over the material to be read.

As will be explained the magnetic reader of this invention is capable of accurately reading a binary coded tape if the reader is tilted to the right or left or forward or backward from the vertical by an angle of approximately 20°. Because of the convenience of the sighting ridge 14 it is unlikely that any operator will tilt the reader by that amount; however, to permit readings at such angles, the magnetic transducer 18 extends below the housing 10 and is provided with a conical working end designed to operate at such a tilt angle.

Figure 2:
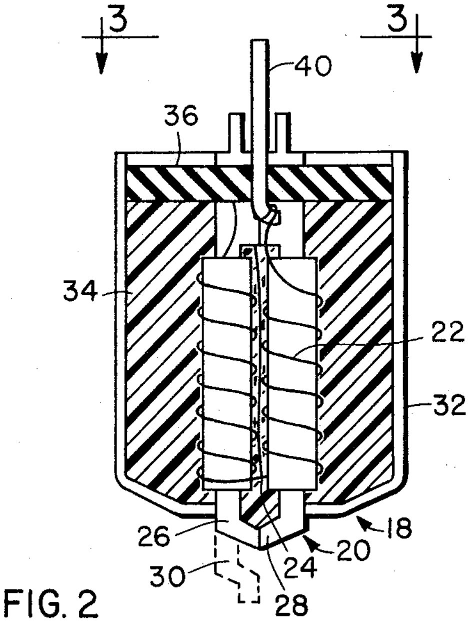
FIG. 2 is an elevation sectional view of the magnetic transducer.

FIG. 2 is a section drawing of the magnetic transducer 18 and shows the laminated magnetic core 20 symmetrically wound with windings 22 of approximately 500 turns that are center tapped at 24. The magnetic core 20 is formed of two separate identical arms 26 and 28 each of which is comprised of four laminated layers of a high permeability core material. The total length of the cores is only one half inch and the laminates are preferably formed by "printing" a great many on a substrate board using a photoresist and etching process. Each of the laminates is only about 0.006 inches thick and is printed with a small handle 30, shown in the dotted line extending from the bottom of head section 26, which facilitates handling during the assembly and winding of the core but which must be ground off after the core is assembled and encapsulated.

Core 20 is mounted in a cylindrical mu metal capsule 32 with the working end of the core 20 extending through the lower end, thereof, and magnetically insulated therefrom by an air space. The lower end of capsule 32 is cone shaped with a taper of approximately 70° from the capsule's longitudinal axis to substantially conform to the working end of the core 20. This permits the reader to be tilted by an angle of up to 20° during the reading operation.

Core 20 is inserted in the mu metal capsule 32 and is held in position by an epoxy potting material 34. An epoxy insulation board 36 is then inserted into the top opening of capsule 32 to form an insulated terminal board to the capsule.

Figure 3:
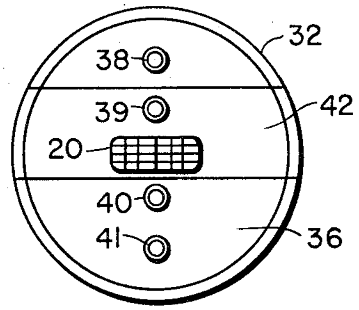
FIG. 3 is a plan view of the magnetic transducer taken along the lines 3—3 of FIG. 2.

FIG. 3 is a plan view taken along the lines 3—3 of FIG. 2 and shows insulation board 36 inserted into the top of capsule 32. Extending through board 36 are electrical terminals 38–41 and also the upper end of transducer core 20. Terminals 38, 40 and 41 are connected to the transducer coils and the center tap while ground terminal 39 only extends into the board 36. After the transducers assembly has been assembled the air gap portion in the lower end of the core 20, and also that portion of epoxy board 36 surrounding terminals 38, 40 and 41, are masked and the entire transducer assembly is plated with a thin coating of hard chrome. This plating serves to provide an electrostatic shielding around the entire transducer capsule and provides an electrical circuit between capsule 32, head 20 and the ground terminal 39 which is electrically connected to the chrome plating, shown generally at 42 between the parallel lines illustrated in FIG. 3.

Figure 4:
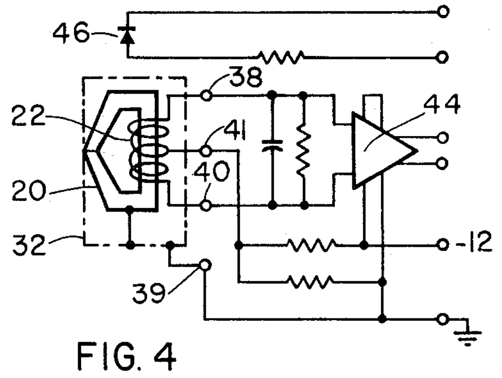
FIG. 4 is a schematic drawing of the circuitry contained in the magnetic reader.

FIG. 4 is a schematic diagram of the amplifier circuitry contained within housing 10 of the magnetic reader. The drawing shows the grounded interconnection between core 20, shield 32 and the ground terminal 39 and further illustrates the center tapped winding 22 coupled through terminals 38, 40 and 41 to an integrated circuit amplifier 44 which may be any convenient IC amplifier such as a type as SN 72733. By thus providing an amplifier in close proximity to an electrostatically and magnetically shielded magnetic transducer there can be virtually no undesirable noise induced into the circuitry. If, however, any noise voltage is induced into the short leads between the shielded transducer and the IC amplifier 44, it will be applied equally to both the negative and positive input terminals of the amplifier and will be cancelled while the signals from the core windings 22 will be amplified. Another important advantage in incorporating amplifier circuitry within the housing of the reader is that IC amplifier 44 may be selected to provide a desirable output impedance that can match the transmission line characteristics between the hand held reader and the analog processing circuitry in the stationary computer terminal equipment.

Figure 5:
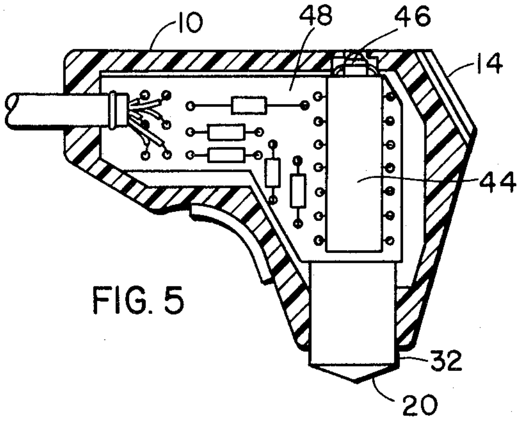
FIG. 5 is a vertical sectional view of the reader showing the position of the internal components.

Illustrated in FIG. 4 is a light emitting diode 46 which is coupled through a suitable resistance to a pair of terminals on the circuit board 48. FIG. 5, which is an view of the interior section of the magnetic reader, shows diode 46 positioned in a recess or aperature in the top surface of the reader housing 10. This light emitting diode 46 is intended to be in signal to the operator and may be used to indicate that the circuit is ready for the reader to be used or may indicate that the reader has sensed the correct or an incorrect number of binary digits from a magnetically coded label. Light emitting diode 46 is coupled to printed circuit board 48 to which is coupled all of the interconnected components illustrated in the schematic diagram of FIG. 4.

Having described a preferred embodiment of the invention, what is claimed is:

1. A hand held magnetic reader adapted for movement along a magnetized medium, said reader including: a housing; a magnetic transducer within said housing and having its working end extending through the bottom thereof; and circuitry within said housing and coupled to said transducer for amplifying the electrical signals therefrom; said magnetic transducer comprising:

a high permeability core, the working end having an air gap and being tapered at an angle of approximately 70° from the longitudinal axis of said core;

a center tapped winding on said core;

a cylindrical capsule of high magnetic permeability material for carrying said core, said capsule adapted for mounting within said housing and having one open end and one end cone shaped at an angle substantially conforming to the tapered working end of said core, said conical end of said capsule having an aperture through which the tapered end of said core may extend;

means for supporting said core within said capsule;

a terminal board of insulating material adapted to fit within the open end of said capsule, said board carrying at least one electrical terminal for the center tap and each end of the winding on said core and at least one ground terminal; and a coating of electrical conductive material on the exterior of said capsule, the core extending through the conical end of said capsule excepting the air gap thereof, and the exterior surface of said terminal board excepting the winding terminals thereon, said coating coupled to electrical ground for providing shielding to said core.

2. The magnetic reader claimed in claim 1 wherein said circuitry includes an integrated circuit amplifier coupled with short leads to the winding terminals of said magnetic transducer.

3. The magnetic reader claimed in claim 1 wherein said housing includes a sight that is alignable between the operator's eye and the magnetized medium to facilitate maintaining the reader in a vertical position during operation.

4. The magnetic reader claimed in claim 1 further including a signal light in the surface of said housing, said light coupled to said circuitry within said housing.

5. The magnetic reader claimed in claim 1 wherein the conical end of said capsule in said magnetic transducer permits contact of the working air gap of said core with the magnetized medium when said reader is tilted approximately 20° from its vertical position.

* * * * *